UNITED STATES PATENT OFFICE.

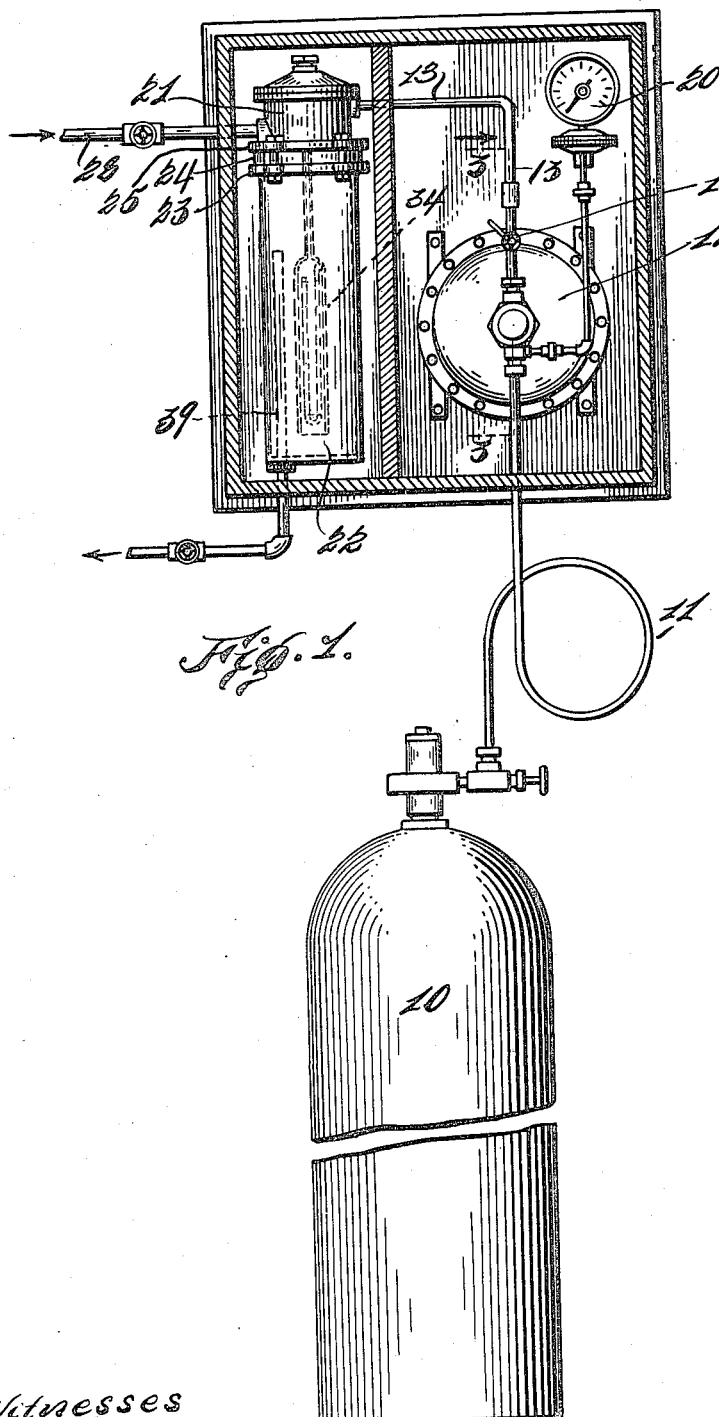

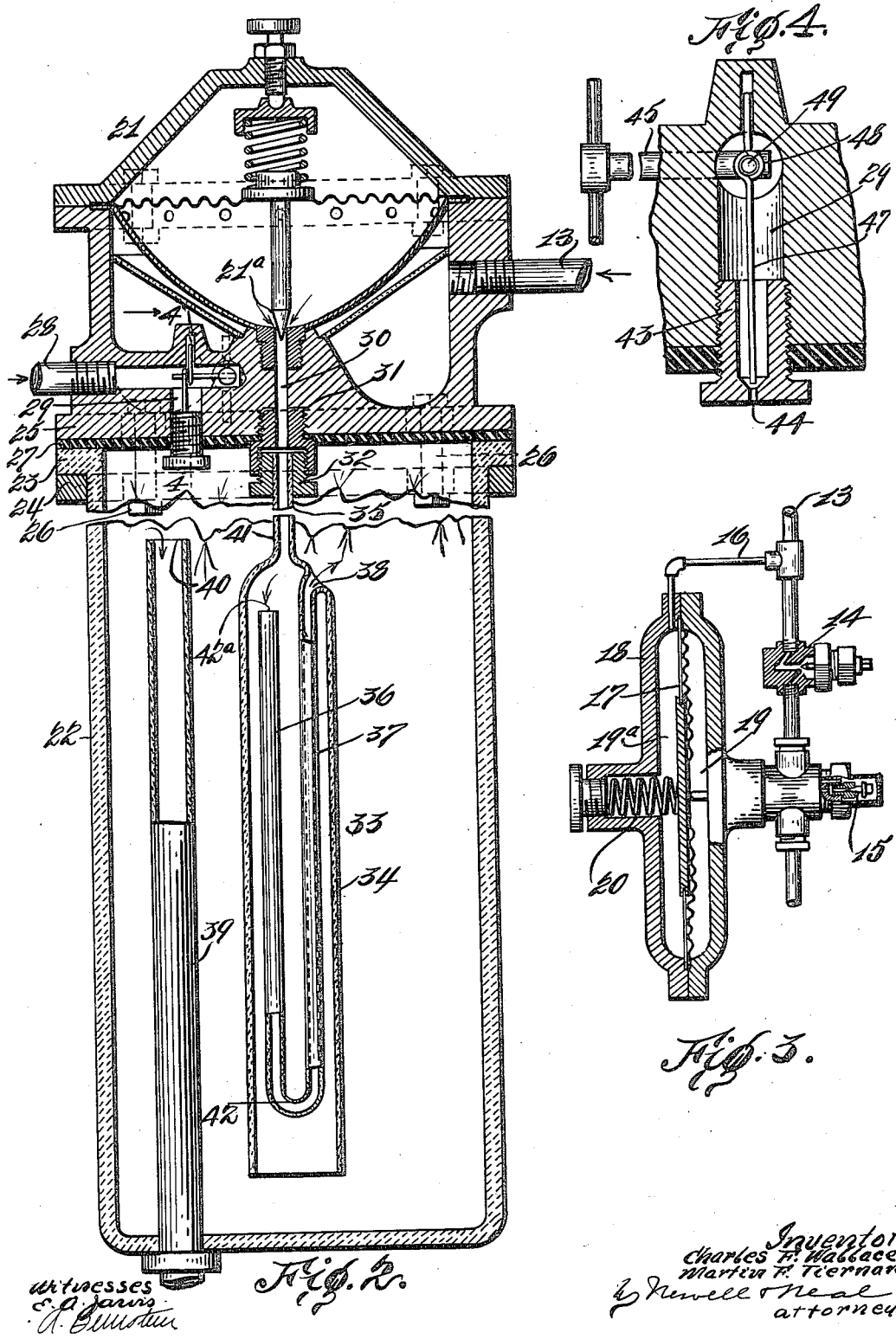

CHARLES F. WALLACE AND MARTIN F. TIERNAN, OF NEW YORK, N. Y.

APPARATUS FOR AND PROCESS OF TREATING LIQUIDS WITH GASES OR PURIFYING WATER.

1,285,492.　　　　　　　Specification of Letters Patent.　　Patented Nov. 19, 1918.

Application filed March 26, 1915. Serial No. 17,124.

*To all whom it may concern:*

Be it known that we, CHARLES F. WALLACE and MARTIN F. TIERNAN, citizens of the United States, residing at Tompkins-ville, borough of Richmond, city and State of New York, and New York, borough of Manhattan, county and State of New York, respectively, have invented certain new and useful Improvements in Apparatus for and Processes of Treating Liquids with Gases or Purifying Water, of which the following is a clear, full, and exact description.

This invention relates to apparatus for and process of treating liquids with gases or purifying water and for dissolving a purifying agent such as chlorin in water, so that a solution may be sent to the point of application to the body of liquid which is to be finally treated. One of the objects of the invention is to provide a closed absorption chamber for the purifying agent, which is admitted under pressure, so that there is a more rapid solubility of the chlorin or other gas in the water according to the well-known law of the solubility of gases under pressure in a liquid. Another object of the invention is to provide means located in a water container for metering the gas as it is admitted to the water. Other objects of the invention are to provide an efficient and practical system for dissolving chlorin gas in water.

These being among the objects of the present invention, the same consists of certain features of construction and combinations of parts to be hereinafter described and then claimed with reference to the accompanying drawings illustrating an embodiment of the invention, and in which Figure 1 is a front elevation of the apparatus;

Fig. 2 is a central, vertical section of the absorption chamber and concomitant parts;

Fig. 3 is an enlarged transverse section on the line 3—3 Fig. 1 of the differential pressure-reducing valve, showing adjunct parts; and Fig. 4 is an enlarged broken section in detail on the line 4—4 Fig. 2, showing means for keeping the jet orifice for the water from fouling.

The apparatus and process forming the subject matter of the present invention are different in a number of respects from the disclosure of our cotemporaneous application, Serial Number 17,123. A single chlorin tank 10 may be used herein, the same leading by flexible tubing 11 to the differential pressure-reducing device 12, which is connected with the gas line or pipe 13, in which back of the main connection of the differential device therewith there is located a control valve 14 for obtaining a drop in pressure. The differential pressure-reducing device is shown in detail in Fig. 3 and comprises a valve 15 which controls the passage leading to the control valve, while back of the control valve there is located a branch pipe 16 which leads to one side of a flexible diaphragm 17 located in a casing 18, in such way as to divide said casing into two chambers 19, 19$^a$, the former being an extension of that chamber in which the valve 15 is located, while the chamber 19$^a$ connects with the branch pipe 16. The flexible diaphragm may of course be reinforced in any suitable manner. The differential pressure-reducing device herein is substantially the same in all respects as that explained in connection with said application, and is provided with a tension spring 20 which presses upon that side of the diaphragm which is adjacent the chamber 19$^a$. The apparatus is also provided with a pressure gage 20 which has a pipe connection with the gas line 13 ahead of the valve 15 of the differential device.

A back pressure device 21 shown in detail in Fig. 2, is connected with the gas line 13 and is in all substantial respects the same as that explained in our cotemporaneous application, Serial Number 17,122, and is provided with a valve proper 21$^a$ for controlling the exit aperture for the gas. Preferably supported by the casing of the valved device 21 is an absorption vessel consisting of a glass chamber 22 provided at its upper end with a flange 23, underneath which there is a ring 24, while the base 25 of the device 21 constitutes a cover or top for said chamber, and through the said cover and the ring 24 there pass suitable bolts 26 for attaching the chamber 22 to said cover. Between the cover 25 and the flange or rim 23, suitable packing 27 may be introduced as for instance a sheet of rubber. Water connection 28 conducts water through a water inlet 29 in the cover or head 25, into the absorption chamber 22, so that said chamber may be entirely or partly filled by water to be treated.

A duct 30 leads through cover 25 from the valve controlled aperture at 21ª, and through an apertured screw plug 31 which is screwed into the cover and is provided with a lower recess into which may be screwed a bushing 32. This bushing supports a hydraulic volumetric meter, all parts of which are preferably of glass so as to render the operation of the meter entirely visible and makes the meter non-corrosive. This comprises a bell or compartment 34 which is open at the lower end at a point preferably adjacent the bottom of the chamber 22, and is provided at its upper end with a neck 35 which is secured in bushing 32. An inverted siphon having a down leg 36 and an up leg 37 is located in the bell or compartment 34, and the upper end of the up leg 37 is provided with an opening 38 which leads through the top of bell 34 into the space surrounding said bell. There extends upwardly through the bottom of the chamber 22 a discharge pipe or leg 39 which is open at its upper end at 40, at a point preferably above the location of the bell 34. The inlet aperture 40 of this discharge pipe is preferably located at a point such that any air trapped in the chamber 22 is carried out by the jet of water, i. e., the jet impinges on the body of water in said chamber in a direction toward said aperture and at a point above said aperture. With no gas in the system, the absorption chamber 22 would be filled with water.

The operation of the parts associated directly with the absorption chamber is as follows: The chlorin gas enters through the pipe 13 and passes the back-pressure valve proper 21ª, through passage 30, down into the meter and thence into the absorption chamber 22, in which it is dissolved by the water coming from the water connection 28, and the resulting solution passes out through the discharge pipe 39 to the point of application. The absorption chamber is kept substantially full of water so that the meter is always submerged at least approximately up to the point 41. As the gas flows into the bell or compartment 34 it will remain trapped therein until the gas level reaches the point 42 at the bend of the siphon. When the downward pressing gas reaches the point 42 before mentioned, it will rush up through the up leg 37 of the siphon, and the bell or compartment 34 will refill with water up to the upper end 42ª of tube 36. This completes one pulsation of the meter and the amount of gas delivered by this one pulsation is of course the capacity of the compartment or bell 34 between the points 42, 42ª. When the gas rises to the top of the absorption chamber 22, it is dissolved by the water substantially as in our said application, Serial No. 17,123, and the resulting solution is forced to the point of application.

The described volumetric meter is adapted to measure both minimum and maximum flows with equal accuracy, and as all openings of the meter are fairly large, there is no danger of clogging or stoppage no matter how small the flow of chlorin may be. Inasmuch as the said meter is located within the water in which the chlorin is measured, and as preferably all related parts are of glass, or the like, the device is certain in action and the action is visible no matter what the rate of flow is. Furthermore, the solution is drawn off from a median point in the absorption chamber sufficiently below the agitated upper surface of the water to obtain a chlorin solution of practically constant strength, regardless of the intermittent pulsating action of the meter.

Means are more fully shown in Fig. 4 for the purpose of keeping the water inlet 44 clean. To this end a screw nipple 43 is screwed into the water passage 29, and is provided with a comparatively small outlet aperture 44, as the amount of gas handled by this apparatus is comparatively small. Rotatably mounted on the cover or head 25 is a shaft 45 which is provided with a suitable handle for the purpose of reciprocating a cleaner rod 47 which depends from said shaft 45 and is adapted to be moved into and out of the water aperture 44. Preferably the upper end of the cleaner rod 47 is provided with an eye 48 which is hung onto a lateral stud 49 on shaft 45 so as to provide a loose joint at this point. It will be seen that if the handle 46 is turned so as to project the cleaner rod 47 into the water aperture 44, the wall of said aperture may be kept clean so as not to interrupt the proper flow of water. In the position shown in Fig. 4, the cleaner rod permits the water to flow into the absorption chamber. The said device may also be used to shut off the water, in which case the rod 47 would act as a valve, which would also prevent the gas from working up into the water connections. The cleaner rod or valve 47 is composed of some metal inert to chlorin, such as platinum or silver. As the water jet coming from the aperture 44 has a strong impinging and emulsifying effect, the rate of solution is increased, and the gas is submitted to a continuous emulsifying effect until its solubility is accomplished. By reason of the fact that the described system is of the inclosed type, it is possible to pipe the solution from the absorption chamber 22 to practical distances and against certain heads, without the aid of pumps. This is due to the fact that the system is closed and so is under pressure.

Certain disclosures of process and apparatus are made herein which will form the basis for separate applications.

Obviously the invention is susceptible of modification, as parts may be omitted, added and substituted without departing from the scope of the invention as claimed.

What we claim as new is:—

1. In an apparatus for treating liquids with gases, the combination of a gas conducting line, means for controlling and regulating the rate of flow of gas through said line, a closed vessel to which said line conducts said gas, a meter submerged in said vessel through which said gas is discharged into said vessel, means for supplying liquid under pressure into the upper part of said vessel, and solution discharge means having its inlet at a median point in said vessel above said meter.

2. In an apparatus for treating liquids with gases, the combination of a gas conducting line, means for controlling and regulating the rate of flow of gas through said line, a closed vessel to which said line conducts said gas, a meter submerged in said vessel through which said gas is discharged into said vessel, means for supplying liquid under pressure into the upper part of said vessel, a back pressure valve in said line at a point ahead of said vessel, and solution discharge means having its inlet at a median point in said vessel.

3. In an apparatus for treating liquids with gases, the combination of a gas conducting line, means for controlling and regulating the rate of flow of gas through said line, a closed vessel to which said line conducts said gas, means for supplying liquid under pressure into the upper part of said vessel, a hydraulic volumetric meter for said gas, submerged in said vessel, and comprising means for subjecting said meter to the pressure of said gas, means for subjecting said meter to the pressure of said liquid, and means for automatically and at intervals discharging said gas from said meter into said vessel, and solution discharge means having its inlet at a median point in said vessel.

4. In an apparatus for treating liquids with gases, the combination of a gas conducting line, means for controlling and regulating the rate of flow of gas through said line, a closed vessel to which said line conducts said gas, means for supplying liquid under pressure into the upper part of said vessel, a hydraulic volumetric meter for said gas, submerged in said vessel, said meter comprising a bell extending down from the gas inlet, and an inverted siphon in said bell and opening out through the upper part thereof, and solution discharge means having its inlet at a median point in said vessel.

5. In an apparatus for treating liquids with gases, the combination of a gas conducting line, a control valve located intermediately thereof for causing a drop in pressure of said gas, a differential reducing valve connected with said line ahead of said control valve and also by a lateral connection back of said control valve, a closed vessel to which said line conducts said gas, a back pressure valve in said line at a point ahead of said vessel, a meter submerged in said vessel through which said gas is discharged into said vessel, means for supplying liquid under pressure into the upper part of said vessel, and solution discharge means having its inlet at a median point in said vessel.

6. In an apparatus for treating liquids with gases, the combination of a gas conducting line, a control valve located intermediately thereof for causing a drop in pressure of said gas, a differential reducing valve connected with said line ahead of said control valve and also by a lateral connection back of said control valve, a closed vessel to which said line conducts said gas, a back pressure valve in said line at a point ahead of said vessel, a meter submerged in said vessel through which said gas is discharged into said vessel, said meter comprising a bell extending down from the gas inlet, and an inverted siphon in said bell and opening out through the upper part thereof, means for supplying liquid under pressure into the upper part of said vessel, and solution discharge means having its inlet at a median point in said vessel.

7. An absorption device for dissolving gases, comprising a vessel for receiving water and a purifying agent, exemplified by chlorin gas, said vessel having separate inlets for water and gas respectively, a hydraulic volumetric meter submerged in said vessel through which said gas is discharged into said vessel, and an outlet for the solution.

8. An absorption device for dissolving gases, comprising a vessel for receiving water and a purifying agent, exemplified by chlorin gas, said vessel having separate inlets for water and gas respectively, a hydraulic volumetric meter submerged in said vessel through which said gas is discharged into said vessel, and an outlet for the solution, the walls of said vessel and said meter being transparent.

9. An absorption device for dissolving gases, comprising a vessel for receiving water and a purifying agent, exemplified by chlorin gas, said vessel having separate inlets for water and gas respectively, a hydraulic volumetric meter submerged in said vessel through which said gas is discharged into said vessel, a back pressure valve controlling said inlet, and the casing of which is mounted upon said vessel, and an outlet for the solution.

10. In apparatus for treating liquids with gases, the combination of a vessel, liquid inlet means, means for introducing gas under pressure into said vessel, a hydraulic volumetric meter in said vessel connected with the gas inlet and adapted to be subjected to the pressure of the body of liquid in said vessel, and comprising means subjected to said gas pressure for producing a pulsating action of the said body of liquid and intermittent discharges of said gas into said liquid.

11. The process herein described, which consists in introducing a liquid into a closed absorption chamber, introducing a gas into the said chamber, producing by said gas an upward movement of the body of said liquid in said chamber, causing the hydrostatic pressure of said upwardly moved liquid to act on said gas and force it into said liquid, whereby a pulsating movement of said body of liquid is produced and quantities of said gas are caused to be applied to said body of liquid at intervals, and dissolving said quantities of gas in said liquid to form a solution.

12. The process herein described, which consists in continuously introducing a liquid into a closed absorption chamber, continuously introducing a gas into the said chamber, producing by said gas an upward movement of the body of said liquid in said chamber, causing the hydrostatic pressure of said upwardly moved liquid to act on said gas and force it into said liquid, whereby a pulsating movement of said body of liquid is produced and quantities of said gas are caused to be applied to said body of liquid at intervals, dissolving said quantities of gas in said liquid to form a solution, and continuously drawing off the so formed solution.

13. The process herein described, which consists in introducing a liquid into a closed absorption chamber, introducing a gas into the said chamber, producing by said gas an upward movement of the body of said liquid in said chamber, in part at least by a direct contact of said gas with said liquid, causing the hydrostatic pressure of said upwardly moved liquid to act on said gas and force it into said liquid, whereby a pulsating movement of said body of liquid is produced and quantities of said gas are caused to be applied to said body of liquid at intervals, and dissolving said quantities of gas in said liquid to form a solution.

14. The process herein described, which consists in introducing a liquid into a closed absorption chamber, introducing a gas into the said chamber, producing by said gas an upward movement of the body of said liquid in said chamber, causing the hydrostatic pressure of said upwardly moved liquid to act on said gas to force it into the upper part of said body of liquid as said body gravitates downwardly, whereby a pulsating movement of said body of liquid is produced and quantities of said gas are caused to be applied to said body of liquid at intervals, and dissolving said quantities of gas in said liquid to form a solution.

15. The process herein described, which consists in introducing a liquid into a closed absorption chamber, introducing gas under pressure into the said chamber, setting up a pulsating movement of the body of liquid in said chamber, and applying said gas to said liquid during the pulsating movement of and by the hydrostatic pressure of said body of liquid, in order to form a solution.

16. The process herein described, which consists in introducing a liquid into a closed absorption chamber, introducing gas under pressure into the said chamber, setting up an up and down pulsating movement of the body of liquid in said chamber, and applying said gas to said liquid intermittently at one point during the pulsating movement of and by the hydrostatic pressure of said body of liquid, in order to form a solution, said gas and liquid being in permanent direct contact at a different point.

17. The process herein described, which consists in introducing a liquid into a closed absorption chamber, introducing gas under pressure into said chamber, opposing the pressure of said gas and liquid, measuring approximately equal amounts of said gas at intervals below the surface of the body of liquid in said chamber and applying said measured amounts of gas to the liquid, to form a solution.

18. The process herein described, which consists in introducing a liquid into a closed absorption chamber, introducing gas under pressure into said chamber, opposing the pressure of said gas and liquid measuring approximately equal amounts of said gas at intervals below the surface of the body of liquid in said chamber, applying said measured amounts of gas to the liquid, to form a solution, and drawing off said solution at a point above the point of measurement of the gas.

19. The process herein described of forming a solution of chlorin gas in water in a closed chamber, which consists in admitting measured amounts of said gas under pressure to and into said water at intervals and maintaining a flow of the solution thus produced into a body of water to be purified thereby.

20. The process herein described of forming a solution of chlorin gas in water in a closed chamber, which consists in admitting measured amounts of said gas under pressure to and into said water at intervals and maintaining a flow of the solution thus produced into a body of water to be purified thereby but against the "head" of the same.

21. The process herein described of forming a solution of chlorin gas in water in a closed chamber, which consists in supplying water under pressure continuously to said chamber, admitting measured amounts of said gas under pressure to and into said water at intervals, and maintaining a flow of the solution thus produced into a body of water to be purified thereby but against the "head" of the same.

22. The process herein described, which consists in continuously introducing a liquid into a closed absorption chamber, and introducing gas from a suitable source into the body of liquid in said chamber in measured amounts at intervals to form a solution.

23. The process herein described, which consists in continuously introducing water into a closed absorption chamber, and introducing chlorin gas from a suitable source into the body of water in said chamber in measured amounts at intervals to form a solution.

24. The process herein described, which consists in continuously introducing a liquid into a closed absorption chamber, and introducing gas under pressure from a suitable source into the body of liquid in said chamber in measured amounts at intervals to form a solution.

25. The process herein described, which consists in continuously introducing a liquid into a closed absorption chamber, introducing gas under pressure from a suitable source into the body of liquid in said chamber in measured amounts at intervals to form a solution, said liquid being caused to agitate the upper surface of said body of liquid as it enters said chamber, and drawing off said solution at a point in the body of liquid where it is more quiescent than its upper surface.

Signed at New York, N. Y., this 22" day of March 1915.

CHARLES F. WALLACE.
MARTIN F. TIERNAN.

Witnesses:
GEO. L. WHEELOCK,
BEATRICE MIRVIS.